United States Patent

Wally, Jr.

[15] 3,639,054
[45] Feb. 1, 1972

[54] PHOTO REPRODUCTION APPARATUS

[72] Inventor: Joseph H. Wally, Jr., Shawnee Mission, Kans.

[73] Assignee: Western Blue Print Co., Kansas City, Mo.

[22] Filed: June 25, 1969

[21] Appl. No.: 836,317

[52] U.S. Cl. ...................355/18, 353/87, 355/55, 355/58, 355/61, 355/67, 355/70
[51] Int. Cl. ...................G03b 27/32, G03b 27/36
[58] Field of Search ...................355/18, 39–42, 355/55, 56, 58, 59, 61, 67, 70, 73, 76; 353/87

[56] References Cited

UNITED STATES PATENTS

| | | | |
|---|---|---|---|
| 1,452,077 | 4/1923 | Huebner | 355/61 X |
| 2,376,416 | 5/1945 | Campbell | 355/61 |
| 2,406,770 | 9/1946 | Huebner | 355/55 |
| 2,458,269 | 1/1949 | Huebner | 355/55 |
| 2,585,927 | 2/1952 | Gelb | 355/55 |
| 2,704,484 | 3/1955 | Schwesinger | 355/58 |
| 2,852,977 | 9/1958 | Hutchins | 355/67 X |
| 2,989,893 | 6/1961 | Wanielista et al. | 355/55 |
| 3,025,758 | 3/1962 | McAdam et al. | 355/70 |

Primary Examiner—Samuel S. Matthews
Assistant Examiner—Richard A. Wintercorn
Attorney—Johnson, Diemer, Emrich, Verbeck & Wagner

[57] ABSTRACT

Photo reproduction apparatus having a motor-driven camera-projector optical head depended from spaced overhead rails on which it moves toward and away from a back- and front-lighted subject holder which supports one end of the rails. The optical head carries a light source on one board and an objective lens on a second board which depend from supporting parallel spaced rods along which they are movable toward and away from the condenser lenses fixed therebetween. One of the condenser lenses supports a film holder; and a rotatable shaft differentially moves both the light source and objective lens so as to permit optimum light convergence at the nodal point of the objective lens during projection and resolution and image definition at the different spatial settings of the film holder from the subject holder during both the negative exposure and the enlarging and printing operations.

25 Claims, 20 Drawing Figures

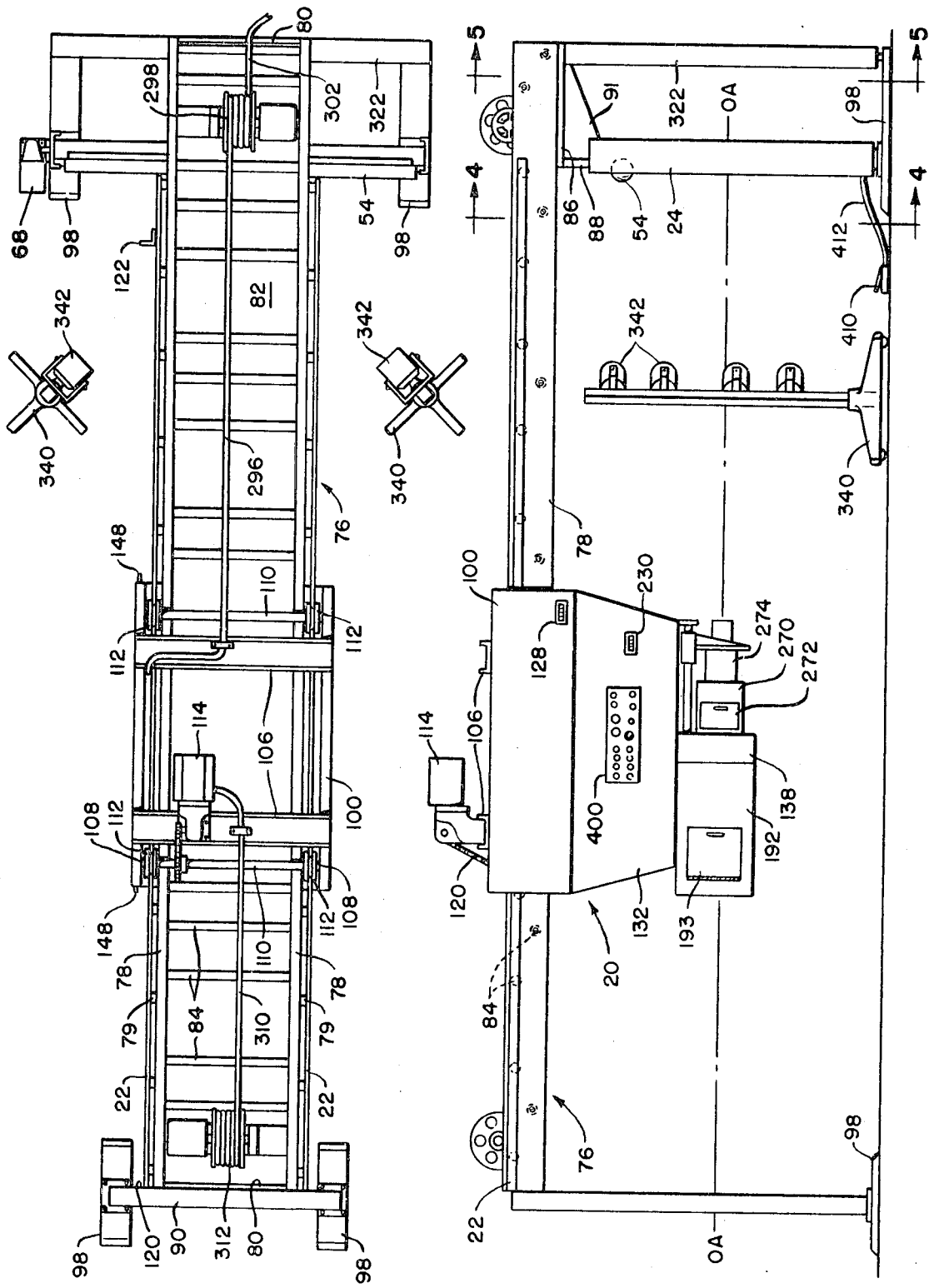

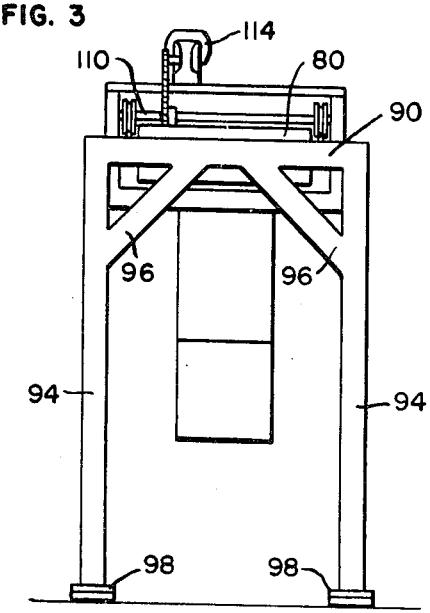
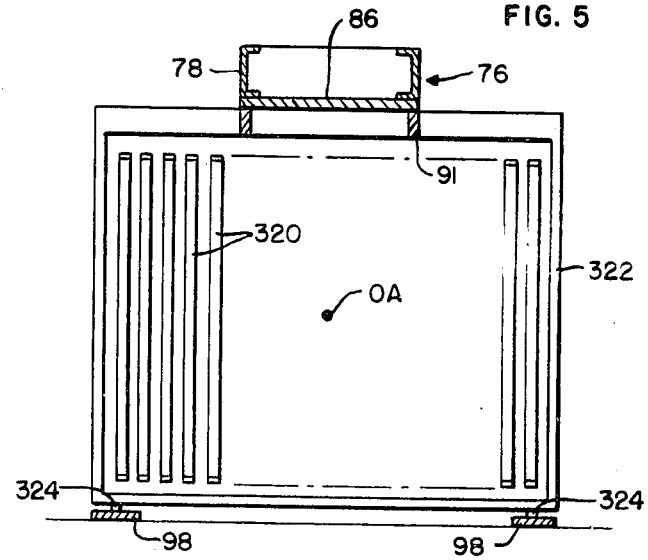
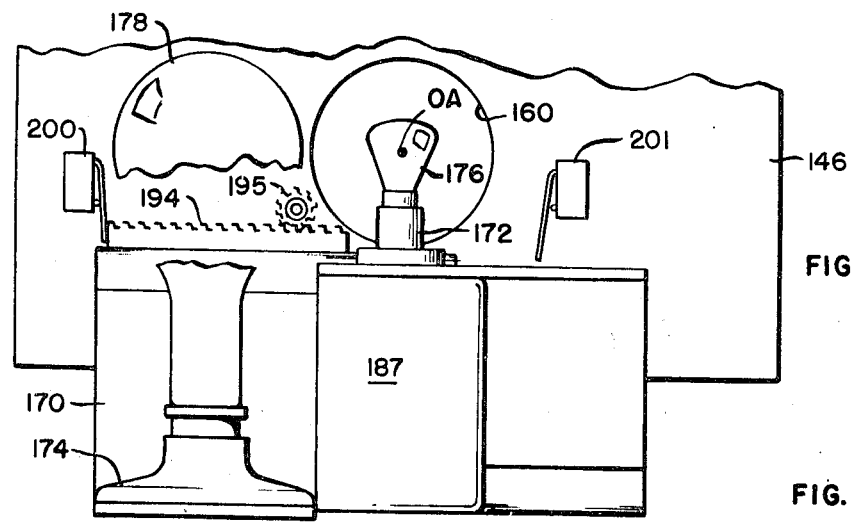
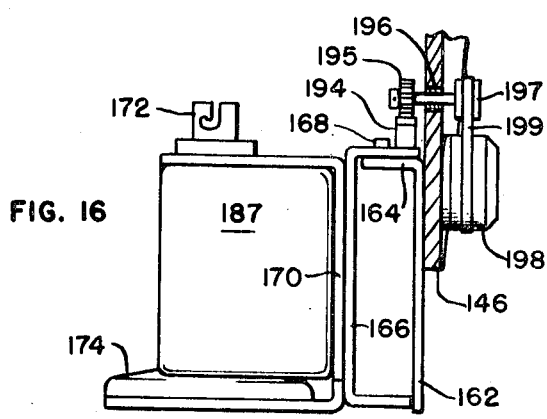
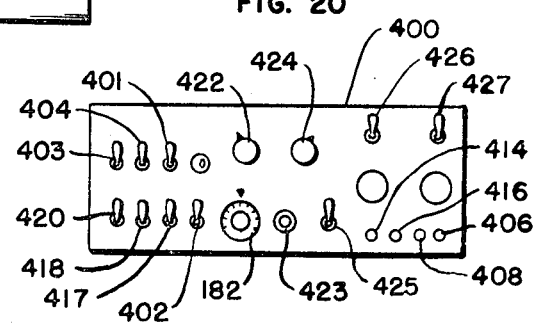

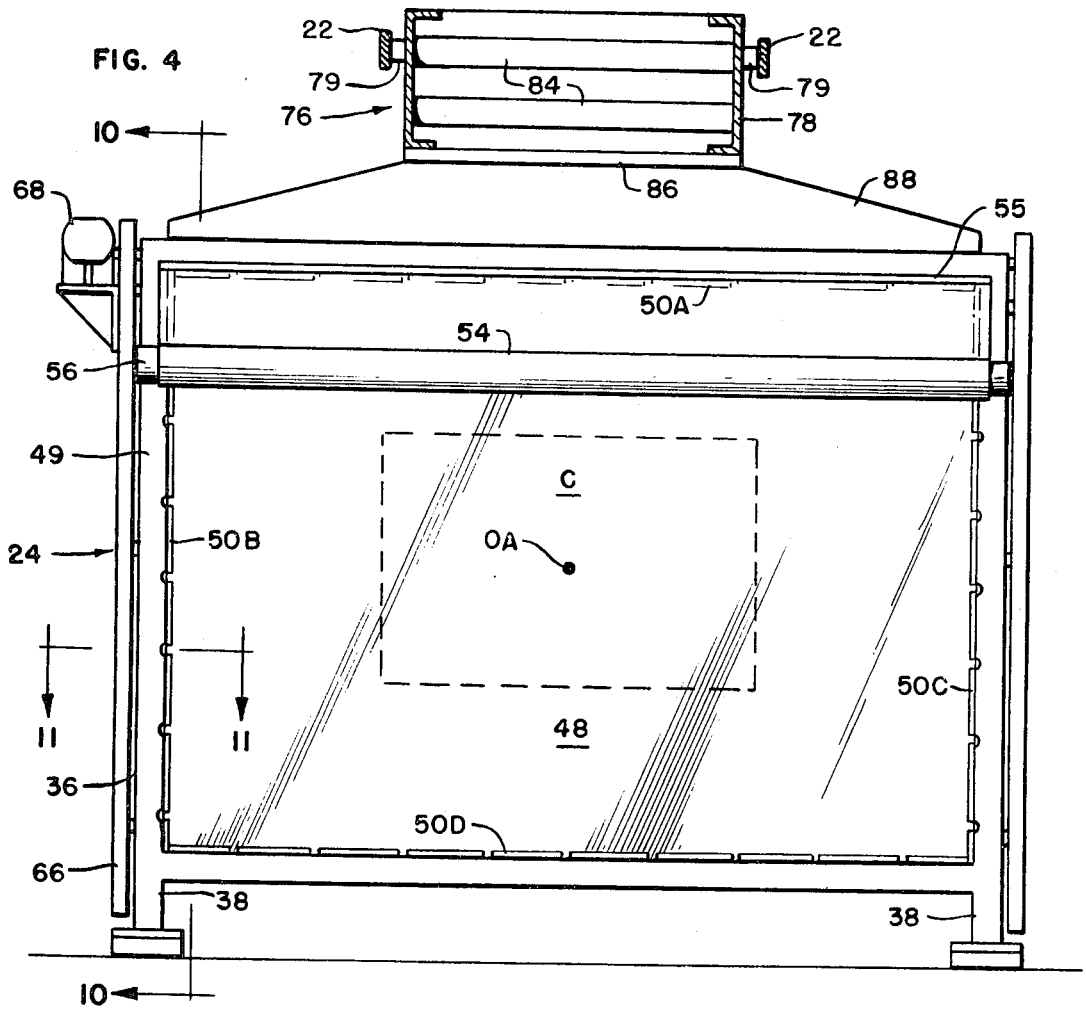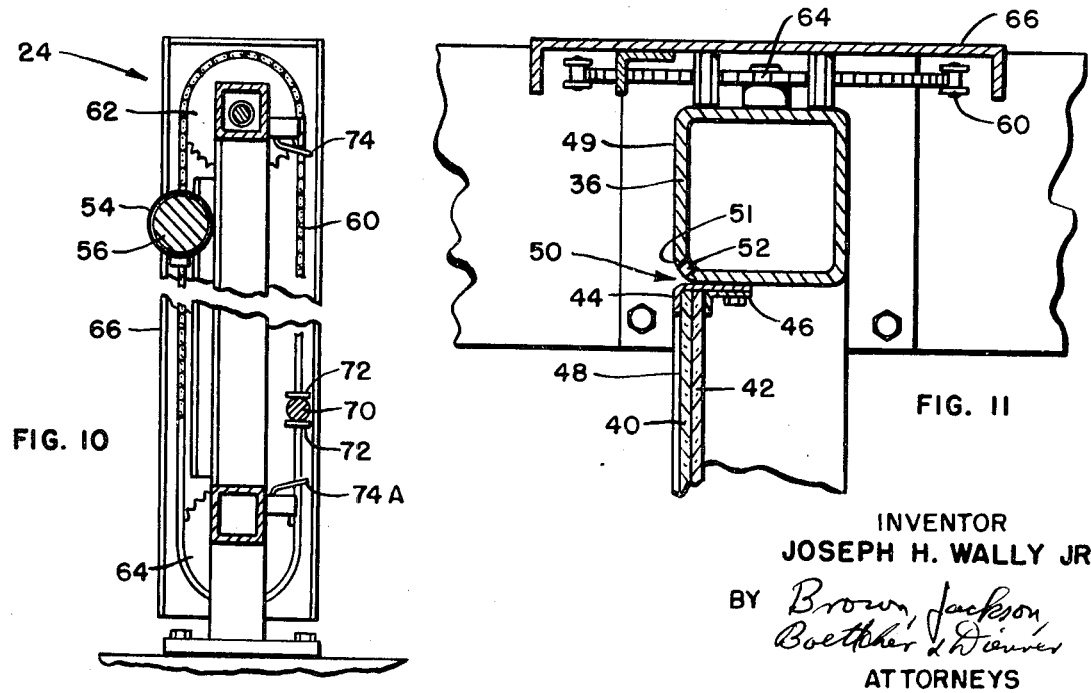

INVENTOR
JOSEPH H. WALLY JR.
BY Brown, Jackson,
Boettcher & Dienner
ATTORNEYS

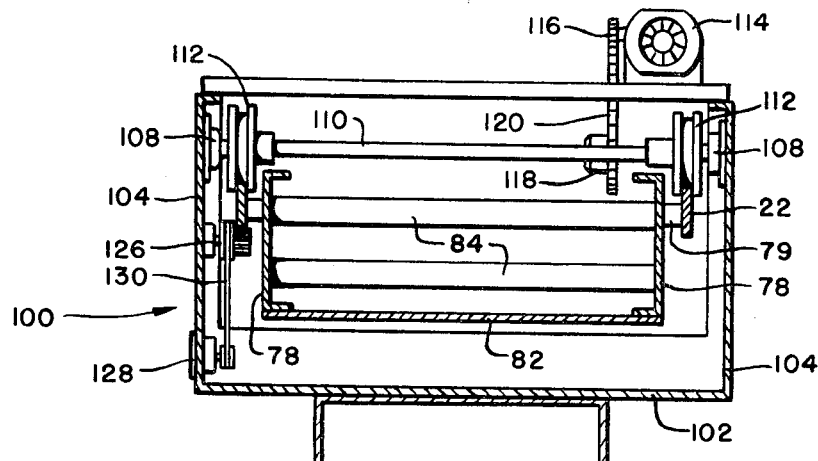
FIG. 8
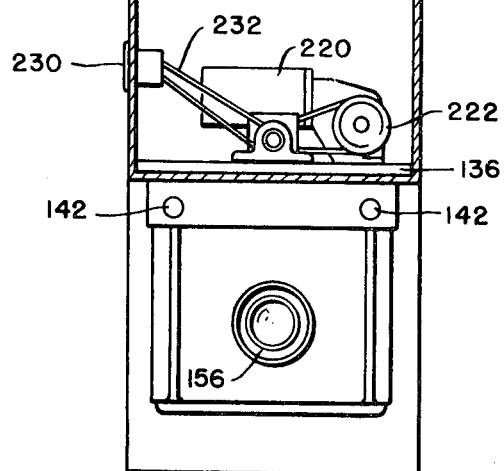
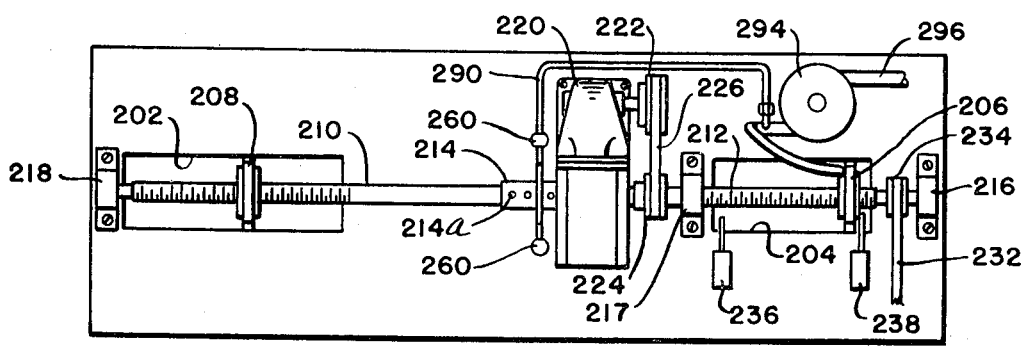
FIG. 9
INVENTOR
JOSEPH H. WALLY JR.
BY Brown, Jackson,
Boettcher & Diener
ATTORNEYS

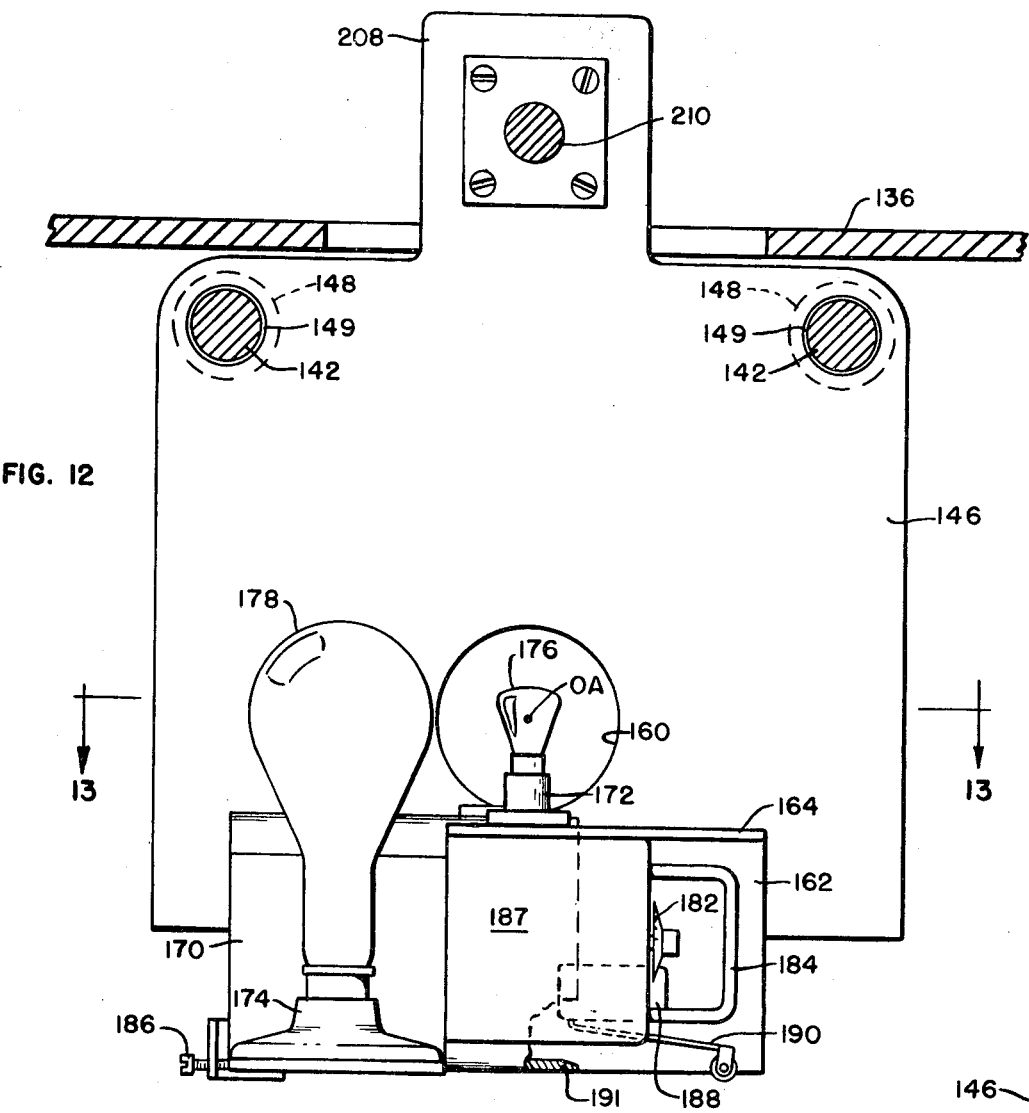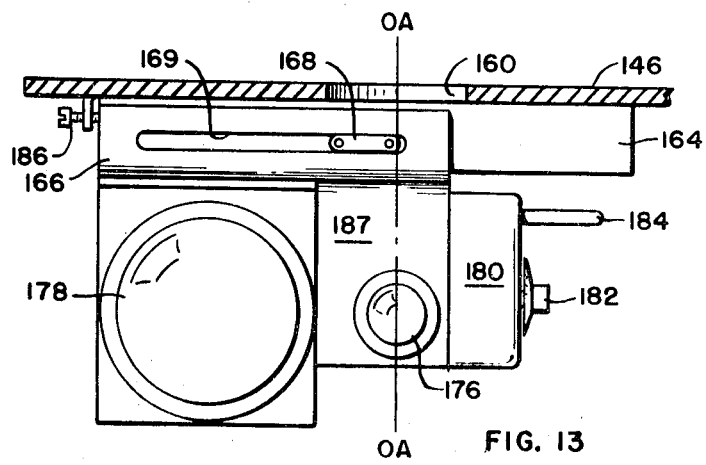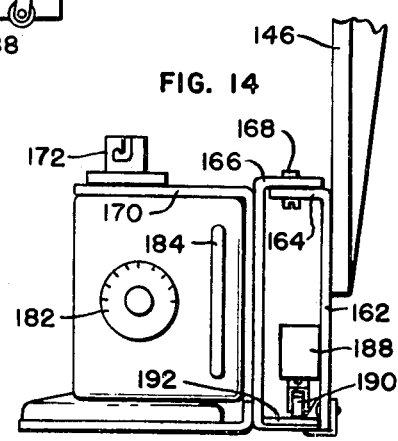

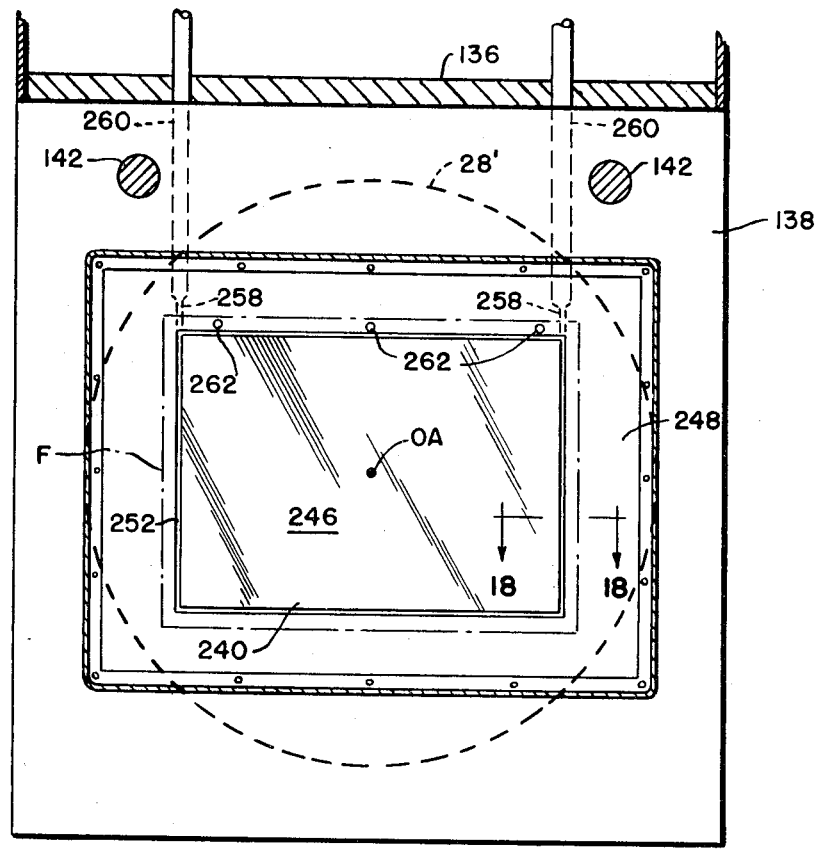
FIG. 17
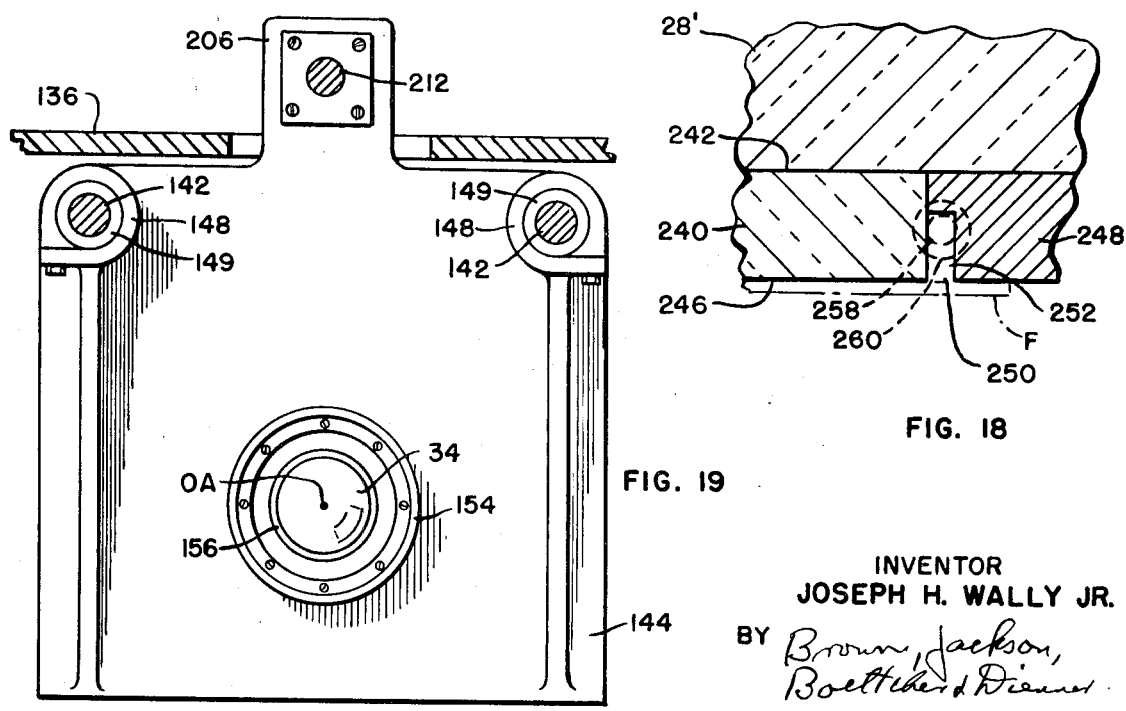
FIG. 18
FIG. 19
INVENTOR
JOSEPH H. WALLY JR.
BY Brown, Jackson,
Boettcher & Diener
ATTORNEYS

PHOTO REPRODUCTION APPARATUS

This invention relates to apparatus useful in photographically reproducing or copying graphic sheet material, although it has many other and allied uses.

A principal object of the invention is to provide novel and improved means and method by which graphic material may be reproduced on film and the film thereafter used to photoprint copies of said graphic material which will have clarity and line definition comparable to and/or better than the original material. The copies obtained may be reproduced either in the same or in a different magnification than the original to meet particular requirements.

In recent years there has come an increased demand for apparatus capable of producing multicopies of graphic material for both industrial and governmental purposes, both to scale and either magnified or reduced. Many of these drawings are several feet long and correspondingly wide. However, the need is not only for equipment large enough to handle the copying of such material, but the standards required of the copies have considerably increased. Often, the drawings are initially prepared in pencil or only partially completed in ink or by some other process. Often the drawing is a composite of drawings which have been spliced or otherwise assembled. Of consequence, the original presented to the copyist will often have areas where the lines are of a different intensity or color. The nonimage areas in the drawing may range from pure white or very light to degrees of mottle or darkness which approach the darkness of the darkest desired lines. Then too, many of the submitted drawings are the result of much reworking and show the results of erasures, typing and staining, and will be of varying quality, whereas what the customer wants are copies in which the lines are sharp, black and true, and the background or nonimage areas are clear, unmottled and stainfree. With today's widespread use of printed circuitry there has also developed the need for a camera which is capable of reducing large scale drawn circuits to a miniature size on a production line basis, but to tolerances sufficiently close that the lines remain absolutely undistorted and to a precise size. It is a feature of the present invention that all the above-recited needs and more can be satisfied utilizing photographic equipment, which although massive in size is precise in its operation and is convenient and simple to use from the operator's point of view, and obtaining excellent results.

In accordance with the invention, a commercially practical photoreproduction unit has been provided which is capable of photographing graphic material in the order of 5×8 feet or larger on film 8½×11 inches and thereafter of reprojecting an image from the developed film back onto the subject holder to pring copies thereof which may be of the same or different size but each one of excellent clarity and line delineation, even though the original material may have been in pencil or otherwise of poor or varying quality.

Thus photoreproduction apparatus in accordance with the invention is characterized by an optical head in which the film holder is immovably fixed, the optical head, however, being capable of moving on overhead ways from which it depends toward and away from a stationary rigid subject holder. The rails are supported on a rigid boxlike structure which is located overhead out of the operator's way and is rigidly mounted at one end to a pair of column supports and at its other end to the subject holder itself. The optical head and its components, including the film holder, in turn are also so precisely related that as the film holder moves toward and away from the subject holder the surfaces of both the subject holder and the film holder remain in a precisely oriented relation and as parallel to each other as it is practical to grind and mount glass sheets. Both the subject holder and the film holder utilize vacuum which hold the copy and film tightly against their respective parallel supporting surfaces and the film holder includes registration means such that every film mounted on the holder is exactly related to the plane of the copy of the subject holder and in the same centered axial relation to the optics of the apparatus as every other film.

A further important feature of the invention is that both the light source and the objective lenses are mounted on the optical head to move on precisely arranged ways such that they continue to define an optical axis which does not change in reference either to the subject holder or the film holder during the movements of the optical head relative to the subject holder to adjust the magnification factor or during the movement of the objective to sharpen the focus of the film on the subject holder.

A further feature of the invention is that the subject holder is not only massive in size and serves to support and precisely relate the movements of the film holder relative thereto, but in addition is particularly adapted to hold the sheet material being copied tightly against the surface thereof.

Thus it is a feature of the invention that in every position of the objective relative to the film holder and of the film holder relative to the subject holder, the same axially centered angular disposition of the film and copy is maintained both during photographing and during printing.

Still another feature of the invention is that the subject holder is made translucent wherefore it may be illuminated from the rear as well as from the front, or both, to more sharply bring out the lines of the graphic material being photographed.

A further feature of the invention is that the operator may print the film image on sensitive material supported on the subject holder by utilizing a point source of light which will promote sharply defined lines or he may utilize a more diffused type of light source such as a flood lamp as when working with continuous tone films.

A particularly important feature of the invention is that the light source is mounted to move with axial adjustment of the objective relative to the film holder such that the light source is automatically positioned at a distance behind the film in accordance with the distance at which the objective lenses are spaced forwardly thereof which causes the image light rays to converge at the nodal point of the objective lens.

A further important feature of the invention is that the apparatus includes means by which the spatial settings of the film holder from the subject holder and also the separation of the objective lens from the film holder as required for proper focusing at an elected magnification may be accurately measured and so that the image developed in the film can be later projected to the subject holder along the same path which the light rays originally traced in producing the image in the film, this without any mechanical deviation from the original physical configuration.

Thus an important feature of the invention is that it provides a construction of photoreproduction apparatus capable of maintaining a precise axial alignment and angular disposition of both the subject holder and the film holder, as well as the objective lens and light source during the axial adjustments required of said elements to obtain the different magnification factors and sharpening of the image. Conversely an important feature of the invention is that axial adjustments of the light source, objective lens and film holder relative to each other and to the subject holder can be facilitated without disturbing their initial precise angular disposition and alignment.

Still another feature of the invention is that means are provided for positively locating and registering the film in relation to the optical axis of the objective lens such that the emulsion on the film is not distorted as by a cover glass therebetween and the objective, and most importantly the developed emulsion layer of the film can be located in exactly the same place when it is projected back as it was when it was exposed in the first place. Since the same lens is used to project the film image as was used in exposing the film emulsion layer to produce the image, photo printed copies can be obtained of an original which are free of distortion and are true to scale.

Furthermore, in accordance with the invention, it is possible not only to produce copies duplicating the original, but it is also possible to optically disect an original by selectively photographing each area of the original to its best advantage on separate films which may then be superimposed to print a copy of more nearly uniform intensity and sharpness of line than the original.

It is also possible to photograph printed circuit masters to close tolerances.

Furthermore, in accordance with the invention all of the above features and objects recited therefor are obtainable in an apparatus which operates smoothly, conveniently and efficiently.

Because the subject holder is mounted vertically and to one side of the working area and the optical head depends from its movable support on overhead rails, the floor area remains clear and uncluttered. This is particularly important to an operator who must work in a dark or only dimly lit room in which the apparatus is normally utilized.

Still another feature of the invention is the novel means provided whereby the controls for operating all the elements of the apparatus may be conveniently centrally localized on a wall of the optical head itself.

Still another feature of the invention is the novel construction of film plenum and means employed to house the objective thereon which facilitate the necessary axial adjustment of the objective for focusing while maintaining the film plenum clean and light tight.

Many other objects advantages and features of the invention will be apparent or will become so from consideration of the detailed description of the preferred embodiment of the invention which will now be described.

Referring therefore now to the drawings wherein like parts are identified by like reference numerals:

FIG. 1 illustrates a preferred embodiment of the invention in side elevation;

FIG. 2 illustrates a top plan view thereof;

FIG. 3 illustrates an end view of the apparatus considered from the left-hand side of FIG. 1;

FIG. 4 is a sectional view taken along lines 4—4 of FIG. 1 looking in the direction indicated by the arrows and shows details of the subject holder;

FIG. 5 is a sectional view taken along lines 5—5 of FIG. 1 looking in the direction indicated by the arrows and illustrates details of the light board by which the subject holder is back lighted.

FIG. 8 is a vertical sectional view taken along lines 8—8 of FIG. 6 looking in the direction indicated by the arrows and shows further details of the optical head and its overhead trolley which moves along overhead supporting rails to adjust the spatial setting of the film holder to the subject holder.

FIG. 9 is a sectional view taken along lines 9—9 of FIG. 6 looking in the direction indicated by the arrows and shows details of the drive by which the objective and the light source mounts are adjustable together toward and away from the condenser lens and film holder during focusing;

FIG. 10 is a vertical sectional view taken along lines 10—10 of FIG. 4 looking in the direction indicated by the arrows and shows the manner of mounting the rotatable transparent cover sheet which is used to precisely locate and hold the material to be copied on the subject holder;

FIG. 11 is a sectional view taken along lines 11—11 of said FIG. 4 and shows details in the construction of the vacuum channel which tightly draw the cover sheet to the supporting surface of the subject holder;

FIG. 12 is a sectional view taken along lines 12—12 of FIG. 6 looking in the direction indicated by the arrows and shows the manner of mounting the point light source and flood lamp for selective axial alignment with the film holder and objective lens;

FIG. 13 is a sectional view taken along lines 13—13 in FIG. 12 and shows details in the slide mounting of the point light source and flood lamp for selective alignment on the optical axis of the objective;

FIG. 14 is an end view thereof taken from the right-hand side of FIG. 13;

FIG. 15 is a fragmented view of the light source mounting board of FIG. 12 and illustrates a modification of the adjustable light source mount;

FIG. 16 is an end view of said modification taken from the right-hand side of FIG. 15;

FIG. 17 is a view taken along lines 17—17 of FIG. 6 looking in the direction indicated by the arrows and shows details in the construction of the film holder;

FIG. 18 is a sectional view taken along lines 18—18 of FIG. 17 looking in the direction indicated by the arrows and shows details in the construction of the film holder;

FIG. 19 is a sectional view taken along lines 19—19 in FIG. 6 looking in the direction indicated by the arrows and shows details in the construction and mounting of the objective lens board; and FIg. 20 is a fragmentary view taken on an enlarged scale of one wall of the optical head and shows the control panel.

Figure 6:
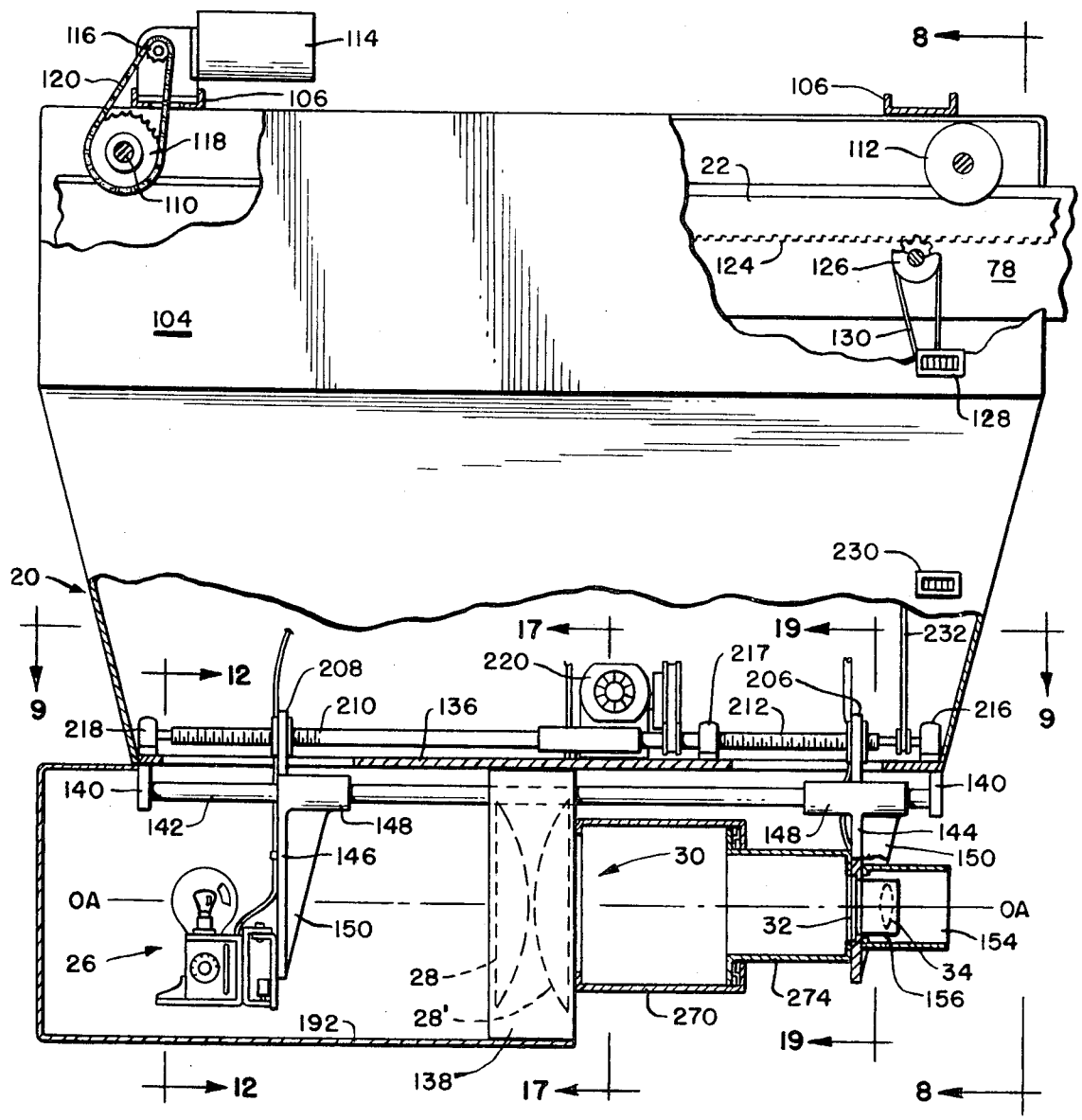
FIG. 6 is a side elevational view taken of the optical head and with portions thereof cut away to show the arrangement and illustrate constructional details of elements comprising said head.

Referring now more particularly to the several views above identified and first to FIGS. 1 and 2, a preferred embodiment of the invention is there illustrated as comprising an optical head indicated generally at 20. As illustrated, said head is adapted to be moved along a pair of overhead rails 22, from which it depends, in directions toward and away from a subject holder indicated generally at 24. In accordance with this invention the optical head 20 serves both as a camera for photographing copy held on the subject holder and as a projector for subsequently displaying on the subject holder the image developed in the film as when printing copies of the original. Thus, as shown in FIG. 6, the optical head includes both light source means indicated generally at 26, the pair of plano convex condenser lenses illustrated at 28, 28' and a transparent film holder 30 which is mounted on the front flat surface of condenser lens 28' facing the subject holder 24. Forwardly of the film holder 30 the optical head supports a shutter indicated generally at 32 and a system of objective lenses 34 which as afterwards more specifically described are adjustably mounted for movement as a unit toward and away from the film holder 30 for sharpening the focus of film in the film holder on the subject in the holder 24. The light source 26, condenser lenses 28, 28' film holder 30 and shutter 32 are arranged in coaxial spaced relation on the optical axis OA—OA of the objective 34 and along which the objective and light source axially adjust as afterwards more particularly described. Said axis OA is parallel to the longitudinal axis of the rails and the axial adjustment of optical head 20 relative to the subject holder 24 also parallels said axis OA—OA.

Referring now to FIG. 4, subject holder 24 comprises a four-sided hollow beamed rectangular shaped frame 36 of rugged construction having extensions 38 at the two sides thereof which form pedestals or feet by which the structure firmly sets on the floor surface, the frame standing in an upright position as illustrated. Within the interior of the hollow frame 36 which may comprise an area approximately 5 feet high and 8 feet wide, is a sheet 40 of transparent water-clear glass backed by a rear sheet 42 of milk-white translucent thermoplastic material such as polymethyl-methacrylate. Sheets 40 and 42 as show in FIG. 11 are mounted between flange supports 44 and 46 secured to the inner side of the frame 36 and such that the front or outer surface 48 of the glass plate is substantially flush with the front surface 49 of the surrounding frame 36. As seen best in FIG. 11, the hollow beam structure of which frame 36 is constructed is essentially square in cross section with radiused corners providing a channel 50 therebetween and the adjacent surface of the mounting flange 44. Channel 50 is rectangular in shape and is continuous about the periphery of surface 48. Through said rounded edge or radiused corner 51 of the frame constituting one side of said channel are a plurality of spaced openings 52 by means of which channel 50 establishes communication with the hollow interior of said frame 36. The hollow interior of the frame 36 is connected to a turbine or other suitable air evacuating means not shown, but which would ordinarily be located in a remote area and connected to the frame by suitable piping. At 54 is a frameless, flexible sheet of clear, transparent polyvinylacetate, Pliofilm or other suitable thermoplastic material having its upper edge secured by suitable means such as 2 inch duct tape 55 to frame 36 immediately above the upper horizontal portion 50A of the channel 50. The remainder of the sheet is rolled on a suitable roller indicated at 56 which, as shown in FIG. 10, is fixed to a chain 58. Sheet 54 is of a width such that it overlaps the two vertical portions 50B, 50C of the channel 50 on the two sides of the subject holder and is of a length such that it may be unrolled to cover the whole area of the glass plate surface 48 and to below the lower horizontal portion 50D of the channel. It will be understood that the outer surface 48 of the glass is ground as flat as commercially practicable and the assembly of glass plate 40 and rear sheet 42 is supported by mounting flanges 44, 46 so that surface 48 is precisely vertical. A sheet of graphic material C placed on said surface 48 may therefore be held flat and in a vertical plane defined by said glass surface 48 by unrolling the transparent cover sheet 54 thereacross, the cover sheet 54 being drawn tightly against the surface 48 and the sheet of graphic material C by the evacuation of the air through the channel 50 and the openings 52 into the hollow of the frame 38 which as aforementioned connects to a turbine air evacuating means. The transparent cover 54 thus holds the sheet of graphic material C immovable and flat against the glass surface 48.

As illustrated by FIG. 10, the two ends of roller 56 on which the cover sheet 54 is rolled fasten to a pair of roller chains 60 which couple about upper and lower sprocket wheels 62 and 64 rotatably secured to suitable supporting structure 66 on either side of the frame 36. One of said upper sprocket wheels 62, the left-hand side one in FIG. 4, is drivingly connected to reversible motor 68 which when energized in one direction will roll the cover sheet 54 upwardly to permit insertion or removal of the graphic sheet material C to be copied and when energized in the opposite direction will unroll the cover sheet 54 downwardly across the material C to hold it tightly in place and flat against the surface 48 of the subject holder. A heavy coiled spring within roller 56 which is prestressed before cover 54 is fastened thereto keeps the cover taut at all times. Preferably the weight of the rolled sheet cover 54 is balanced by a counterweight in the form of a bar 70 having its ends connected to the two chains 60 on the reverse side of the subject holder. Said counterweight bar 70 preferably has its two ends suitably shaped so that they constitute stops 72 which engage upper and lower limit switches 74 and 74A in the motor circuit and define the limits through which the cover sheet may be rolled or unrolled by roller 56.

Referring again to FIGS. 1 and 2, the two rails 22 on which the optical head 20 moves toward and away from the subject holder 24 are rigidly supported by a boxlike structure designated generally at 76. Said structure 76 comprises a pair of spaced ruggedly constructed U-channel side beams 78 to the outside of which are mounted said rails 22 by spacers 79. The two ends of said boxlike structure 76 are closed by rugged end plates 80 of thick sheet metal welded to the ends of said side beams 78. A bottom plate 82 (FIGS. 2 and 4) of similarly thick sheet metal spans the space between said beams and end plate and is suitably welded or otherwise secured thereto. The spacing of the channel side members 78 are further strengthened and reinforced by strategically located double rows of bracing rods 84 (FIGS. 1, 2 and 4), which are bolted through side members 78.

Considering now again FIG. 1 with FIG. 4, it will be seen that the rear ends of the U-channel side members 78 of the rail supporting structure 76 are rigidly fastened as by welding to a one inch steel plate 86 which in turn is bolted to the flattened top edge of a truncated plate member 88 welded to the top span of frame 36 of the subject holder 24 and reinforced by rearwardly extending cantilever brackets 91 which are edge welded both to the plate 88 and 86.

Considering now also FIG. 3 with said FIGS. 1 and 2, it will be seen that the forward end plate 80 of the rail supporting structure 76 is bolted to a cross bar 90 of closed channel or hollow beam structure which in turn is welded to the upper ends of a pair of vertical columns 94 of similar tubular stock, braced by angular pieces 96 which are end welded to vertical columns 94 and interconnecting cross member 90. Plate 80 is also bolted to said angular braces 96. It will thus be apparent that the supporting structure 76 can be precisely fixed at right angles to the vertical extent of subject holder 24 and the columns 94 and so precisely locate the rails 22 supported thereby in a rigid immovable parallel spaced relation and at right angles to the vertical surface 48 of the subject holder 24 on which graphic material C to be copied is supported. The columns 94 which support the front end of the rail supporting structure 76 and the pedestals 38 of the subject holder which support the rear end of said supporting structure 76 may be shimmed in conventional manner to locate the supporting structure 76 and thereby the rails 22 in an exactly true horizontal relation. However, usefully shims 98 are of the type which can be positioned beneath each said column and pedestals and suitably air inflated. Pump means, not shown, connect to said inflatable shims and under the control of level sensing means maintain the rail supporting structure 76 in true horizontal position. The inflated shims provide the further advantage over more conventional solid shims in that they cushion the apparatus at its four points of support and so act as shock absorbers to minimize the effect vibrations of the building might otherwise have on the photographic processes for which the apparatus is utilized.

Considering now FIGS. 6 and 8 with FIGS. 1 and 2, optical head 20 is movably supported on rails 22 by a generally U-shaped housing or trolley 100 having a bottom wall 102 which spans beneath the rails 22 and bottom plate 82 of the rail supporting structure and opposed sidewalls 104 which extend vertically outside the two channel side members 78 of the supporting structure 76. Both said opposed side walls 104 and the bottom wall 102 of the trolley are of heavy gauge rigid sheet metal and the open upper end thereof is reinforced by channel shaped braces 106 connecting sidewalls 104 of the trolley above the supporting structure 76. The two sidewalls 104 of the trolley 100 support two pairs of bearing mounts 108 in which are rotatably supported the ends of a pair of axles 110. Fixed to said axles 110 for rotation therewith in said bearing mounts 108 are trolley wheels 112. As shown in FIG. 8, trolley wheels 112 have continuous grooves in their outer periphery precisely shaped to engage about the upper edge of the rails 22 and so as to afford essentially no lateral movement. This precision relationship is possible because of the true parallel relation into which the rails 22 can be located and held by the rigid supporting structure 76.

One of the channel braces 106 supports a reversible motor 114, having its arbor adapted by a gear 116 mounted thereon to drive a larger diameter gear 118 on one of said two axles 110 through an interconnecting chain 120. Thus depending on the direction in which motor 114 is rotated, the optical head 20 may be moved with the trolley 100 toward and away from the subject holder 24. At the forward and rear ends of the trolley 100 are a pair of limit switches 148 positioned to be engaged by stops 120 and 122 (FIG. 2) on the supporting structure to open the circuitry of motor 114 at the limits of their forward and reverse movement. On the underside of one of the rails 22 is a toothed rack 124 (FIG. 6) with which a pinion 126 meshes. Pinion 126, in turn, is used to operate a meter 128 through a belt 130. Meter 128 is thus useful to indicate to the operator a numerical value of the spacing or separation of the optical head (and more specifically the film holder 30) from the surface 48 of the subject holder at any one time.

Welded or otherwise rigidly connected centrally of the bottom wall 102 of the trolley housing 100 is a housing member 132 (FIG. 8) having vertically extending sidewalls and inclined front and rear walls welded along their bottom edge to a thicker horizontally disposed bottom wall or plate 136. Bottom wall 136 is formed of sheet metal plate of sufficiently thick gauge as to provide a solid rigid unyielding support for the optical elements of said head which are mounted therebeneath. Said wall 136 also provides support for the operating structure on which the light source and objective lenses are moved relative to each other and to the film holder as will now be described.

Rigidly mounted to the underside of said bottom wall or mounting plate 136 approximately midway of its front and rear ends is a rectangular shaped boxlike member 138 providing enclosing support for the aforementioned pair of planor-convex condenser lenses 28, 28'. As illustrated in FIG. 6, the two condenser lenses are arranged in conventional manner with their convex sides in facing relation and their flat sides facing outwardly. Enclosure 138 includes front and rear walls which lap the outer periphery of the flat side of the two condenser lenses so as to tightly seal the interior of the enclosure against the entrance of dirt and the like. Mounted adjacent the opposite ends of mounting plate 136 and on its underside are a pair of depending laterally extending bearing members 140 which fixedly support the ends of two stainless steel guide rods 142 in spaced parallel relation to each other. These rods are spaced far enough apart that their intermediate portions which extend through the condenser housing enclosure 138 lie to the outside of the periphery of the condenser lenses (FIG. 13). Guide rods 142 serve to support lens board 144 and light board 146 in aligned parallel relation. Each of said lens board 144 and light board 146, as shown in FIG. 6, include elongated cylindrical bearing portions 148 which have linear recirculating zero clearance ball bearings 149 about the guide rods 142 and are of sufficient length that their bearing engagement with said rods 142 prevent lateral or twisting movement of the boards in any direction. The rigidity of the structure is also increased through the use of triangular shaped cantilever ribs 150.

As shown in FIG. 19, lens board 144 has a centrally located aperture 152 concentric with the center line or axis OA of the condenser lenses 124 and secured about said opening 152 is a cylindrical shield 154 which houses the mount 156 for the aforementioned objective lenses 34 and shutter 32. As shown in FIG. 12, light board 146, which is located to the opposite side of the condenser lenses 28 also includes an opening 160 coaxially aligned with the central axis of the condenser lenses 28 and the objective 34 and shutter 32. The axis along which said elements are concentrically arranged is identified in FIGS. 1 and 6 at OA—OA and is parallel to the axial movement of the optical head 20 along rails 22.

Now considering FIGS. 12, 13 and 14 with FIG. 6, secured to projector light board 146 is a flanged member 162 having a horizontal portion 164 disposed immediately below opening 160 which serves as a mount for slide 166. Slide 166 is shown slidably keyed on horizontal portion 164 by means of an elongated guide projection pr key 168 which seats in a longer slot 169 therein. Said slot 169 extends generally parallel to the plane of the projector light board 146 and at right angles across axis OA. Fastened to slide 166 is a mount 170 providing support for laterally spaced sockets 172 and 174. Socket 172 receives a miniature lamp 176 providing a point source of light emanating from its filament. Socket 174 receives a larger sized flood lamp 178. Sockets 172 and 174 are so located that the respective lamps when mounted therein have their filaments aligned at the height of axis OA and are so spaced apart that with reciprocal adjustment of slide 166 within the limits permitted by key 168 in slot 169 the two lamps may be selectively located with their filaments on axis OA. Since miniature lamp 176 will usually be of a smaller voltage than the conventional supplied voltage, a transformer 187 is provided in the line thereto. 182 represents the control knob of a rheostat 180 which may be associated with the power supply to either or both sockets 172 and 174 and permits varying the intensity of the point source lamp 176 or the flood lamp 178. At 184 is a handle which the operator may grasp so as to selectively align either the point source lamp 176 or the flood lamp 178 with opening 160, the limit of the lateral movement of slide 160 being determined by the length of slot 169 in which guide 168 extends. The length of this lateral movement may be adjusted by means of thumb screw 186. 188 represents a double throw switch operated by a feeler 190 adapted to be engaged by portion 191. As illustrated, point source lamp 176 is aligned with its filament on axis OA in opening 160. Feeler 190 is disengaged and switch 188 is conditioned to energize lamp 176. Flood lamp 178 is deenergized. When slide 166 is moved to the right of FIG. 12 so as to align flood lamp 178 with axis OA projection 191 engages and lifts feeler 190. The effect of this is to deenergize lamp 176 and to energize flood lamp 178.

The projector light source board 146, lamps 176 and 178 and associated structure are enclosed within a suitable compartment 192 shown in FIGS. 1 and 6 as disposed on the under side of mounting plate 136 and united to the condenser lens enclosure 138. The adjacent side of enclosure 138 and mounting plate 136 thus constitute two walls of said compartment 192. An access door is provided therein at 193 to permit changing bulbs and/or the manual actuation of rheostat control knob 182 and grasping of handle 184 for selective alignment of lamps 176 and 178 on axis OA.

The selective alignment of flood lamp 178 and point source lamp 176 may also be remotely controlled from panel 400 to the outer wall of the optical head housing 132 (FIGS. 1 and 20) as by toggle switch 401. Rheostat 180 and its knob 182 also may be conveniently located on control panel 400. One such arrangement is illustrated by FIGS. 15 and 16. In this alternate arrangement, lamps 176 and 178 are mounted as before in sockets 172, 174 appropriately spaced on mount 170 which is carried by slide 166. Slide 166 is keyed by means of guide projection 168 in slot 169 so as to be restricted to reciprocal transverse movement in directions at right angles to axis OA. In this modification, however, the movement of slide 166 is under the control of a reversible motor 198 shown in FIG. 16 mounted on the opposite side of the point source light supporting board 146. On slide 166 is a rack 194 which extends parallel to slot 169 and meshes with the toothed periphery of pinion 195 fixed to one end of shaft 196 to rotate therewith. As shown in FIG. 16, shaft 196 extends through a provided opening in board 146 and is rotated by a belt-driven pulley 197 fixed to its opposite end. Motor 198 is of the reversible type and drives belt 199 to turn pulley 197 in accordance with the direction in which the motor is operated. At 200 and 201 are a pair of stops or limits comprising microswitches which are strategically located at the limits of the reciprocal movement of slide 166 so as to interrupt the operating circuit of motor 198 and simultaneously energize the lamp aligned with opening 160 and axis OA. The circuitry therefor is conventional and constitutes no part of the present invention. Thus FIG. 15 shows rack 194 engaging microswitch 200. In this position of rack 194, motor 198 is stopped with lamp 176 on axis OA and lamp 176 is energized. Lamp 178 is deenergized. Toggle switch 401 is in one of two actuating positions. By moving toggle switch 401 to its second position, motor 198 will be reenergized in reverse and will turn belt 199 in the opposite direction causing pinion 195 to rotate and move rack 194 in the opposite direction far enough to engage microswitch 201. Closing of microswitch 201 again stops the motor with flood lamp 178 now aligned with axis OA. Floodlamp 178 is now energized and lamp 178 is deenergized. By returning toggle switch 401 to its first position the lamps can again be relocated to the positions illustrated by FIG. 15.

A further feature of the invention as mentioned above is the automatic respacing of the light source behind the condenser lens and film with axial adjustment of the objective to maintain convergence of the film images' light rays substantially at the nodal point of the objective. The arrangement employing a chain drive shown in U.S. Pat. No. 2,843,010 issued July 15, 1958 to Joseph H. Wally, Jr. and Louis J. Grunwald, may be employed. However, a preferred arrangement is illustrated in FIGS. 6 and 9. As shown in said FIGS. 6 and 9, mounting plate 136 has openings 202 and 204 to the front and rear of condenser housing 138. Lens board 144 has an upright portion 206 extending through opening 204 and light board 146 has an upright portion 208 extending upwardly through opening 202. At 210 and 212 are a pair of threaded shafts respectfully joined together by coupling means 214. Shaft 212 is journaled in spaced pillow blocks 216 and 217 and the outer or rear end of shaft 210 is journaled in pillow block 218. At 220 is a reversible electric motor which drives a pulley 222 to rotate a second pulley 224 on shaft 212 through belt 226. Shafts 210 and 212 being coupled at 214 effectively rotate together. Said shafts 212 and 210 have threaded engagement with said upright portions 206 and 208 respectively of the lens board 144 and projector light board 146 so that they move together relative to the condenser lenses 28, 28' and film holder 30 with the energizing of motor 220. Motor 220 is reversible so that when rotated in one direction it moves lens board 144 toward the film holder 30 a distance sufficient to obtain proper focusing of the objective on the film at the distance at which the film holder is spaced from the subject holder 24 through the operation of motor 114 above described. Shaft 212 being coupled to shaft 210 rotates therewith in the same direction. The pitch of the threads on shaft 210 are, however, wider than the pitch of the threads on shaft 212 so that its light board via extension 208 is moved a greater distance than is the lens board via its extension 206. By rotating motor 220 in the opposite direction, lens board 144 can be moved away from the film holder, the projector light board 146 simultaneously moving a proportionate distance closer to the condenser lens. Thus it will be understood that with rotation of motor 220, objective lens board 144 and projector light board 146 always moves together in the same direction, but not at the same amount. The pitch of the threads in shaft 212 are related to the pitch of the threads in shaft 210 such that at the different positions to which the objective lens 34 is positioned relative to the film holder and the condenser lenses, the light source aligned on axis OA will be moved a proportionately greater distance relative thereto such that the light rays received by the condenser lenses from the light source mounted on the light board will always converge substantially adjacent or at the nodal point of the objective lenses 34. This ratio will depend on the particular characteristic of the objective lens being used at 34.

It will be understood that set screws 214a in coupling 214 may be loosened to accommodate not only the convenient separation and assembly of shafts 210, 212, but also to adjust the initial spacing of portions 206 and 208 to the requirements of the objective and condenser lenses.

At 230 is a second meter operatively driven through belt 232 of a pulley 234 on shaft 212 to provide the operator with a second reading indicating a numerical value of the spacing of the objective lenses from the film holder 30. As also shown in FIG. 9, extension 206 of lens board 144 travels between limit switches 236 and 238 in the operating circuit of motor 220 which define the limits of the movement through which the lens board and thereby the objective lens may be axially adjusted in the focusing adjustment.

Referring now to FIGS. 17 and 18, film holder 30 is illustrated as comprising a glass platen 240 having its inner surface 242 fused or cemented to the adjacent flat surface of the condenser lens 28'. The outer surface 246 of platen 240 which faces the subject holder and supports the film F is parallel to the platen surface 242 and is ground as flat as practicable and precisely parallel faces, and is supported essentially parallel to the surface 48 of the subject holder 24. Surrounding glass platen 240 is a frame 248 comprising a pat of the housing 138 which encloses the condenser lenses 28, 28'. Platen 240 is preferably rectangular in shape and the framing wall 248 includes a recessed portion 250 in its inner edge adjacent the periphery of the platen to define a continuous channel 252 about platen 240. At 258 are a pair of openings through the material of wall 248 which establish communication between said channel 252 and conduits 260 which connect to the main vacuum line 290 (FIG. 9). Mounted in framing 248 over the upper horizontal extent of the channel 252 are three equispaced registration pins 262 (FIG. 17). F shown in phantom lines in FIGS. 13 and 14 represents a film having correspondingly dimensioned and spaced openings to receive, and by means of which it may be positioned over said registration pins 262. Film F has a width and a length slightly in excess of the width and length of the rectangular channel 252. Pins 262 thus serve to positively center the film in a predetermined angular disposition to the optical axis OA, and conduits 260, being connected to the aforementioned air evacuating pump to which the channel of the subject holder is also attached, as will be afterwards described, evacuate the air from beneath the film so as to draw the film tightly against the flat surface 246 of the platen 240. The film can therefore be repetitively located in the same parallel registered relation with respect to the optical axis OA and the surface 48 of the subject holder. Consequently nothing is disposed between the emulsion layer of the film and the objective to distort or otherwise affect the image rays of light to the objective and the emulsion layer is located in exactly the same place and relation to the objective for both initial image exposure and/or printing or projection exposure after the film has been developed. Where focal tolerances of less than 0.001 are to be observed as is the case here, it becomes imperative to be able to leave an image unadulterated with an optical factor such as a cover glass over the film provides.

Figure 7:
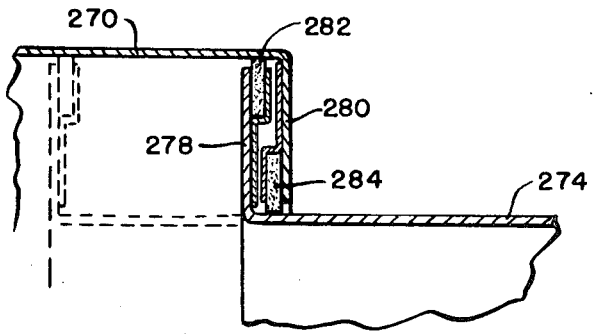
FIG. 7 is an enlarged detailed view showing one arrangement for obtaining a light seal between the film plenum and the telescoping element thereof which moves with the objective during focusing adjustments.

As shown in FIG. 6, film holder 30 is enclosed by a rectangular shaped plenum or chamber 270 having an access door 272 as shown in FIG. 1. Telescoped within said plenum 270 is a second smaller sized rectangular member or bellows 274 having its forward end secured to the rear side of the lens board 144 about said opening 152. As shown in FIG. 7, bellows member 274 has a continuous outwardly directed flange 278 interfitting with inwardly directed continuous flange 280 of the plenum. Both said continuous flange walls 278 and 280 support gaskets 282 and 284 respectively. Said gaskets are formed of felt or other suitable material and protrude slightly beyond the extent of the respective flange wall on which they are mounted. Together they provide a continuous double seal with the adjacent wall of the respective plenum 270 and bellows member 274 which assures a completely lighttight juncture between the plenum and bellows both during the above described axial adjustments and in the various settings of the lens board 144 from the film holder within plenum 270.

One of the features of the invention is the support of the optical head 20 on the overhead rails 22 so that the floor on which the apparatus is mounted may be kept essentially clear of structure over which the operator may trip, as when he is working on the subject holder to set up material to be copied. It is also highly desirable that all of the controls except possibly the controls which raise and lower cover sheet 54 on the subject holder 24 should be centralized on the optical head 20. Such a centralization is indicated in FIGS. 1 and 20 at 400. This, however, creates the problem of connecting the electrical and vacuum operated elements in the optical head to their supply sources. In the present invention this is conveniently accomplished utilizing the rail supporting structure 76. Considering FIG. 9 with FIG. 2, the air evacuating conduits 260 leading from channel 252 of the film holder is connected to a line 290 leading to a solenoid valve 294. Solenoid valve 294, in turn, is connected by a flexible conduit 296 which is led through the interior of the rail supporting structure 76 to a spring loaded reel 298 on which it is wound and unwound. Conduit 296 is connected from said reel by a further flexible connector 302 over the top of the subject holder to remotely locatee vacuum pump (not shown). It will thus be appreciated that as the optical head moves under the drive of motor 114 to the right of FIG. 2, reel 298 will rotate to take up the slack of the conduit 296 and when the motor 114 moves the optical head in the opposite direction, reel 298 will pay out the conduit line 296. Similarly, the electrical wiring to the transformer, rheostat and lamp sockets on the projector light board 150, as well as to the motor 114 which moves the optical head and to motor 220 which moves the projector light and lens boards 146, 144 and desirably also the wiring which connects the bank of front lighting lamps 342 and back lighting lamps 320 to switches on the control panel 400 as afterwards described, are also connected into a flexible mainline indicated at 310 in FIG. 2. Said line 310 is similarly wound on a spring-loaded reel 312. Thus with movement of the optical head under the drive of motor 114, reel 312 is simultaneously operated to take up slack or pay out electrical conduit line 310, depending on the direction in which motor 114 moves the optical head relative to the subject holder.

As shown in FIGS. 1 and 2, surface 48 of the subject holder 24 may be illuminated by strategically located banks of quartz iodine lamps 342 supported on portable pedestals 340. Although pedestals 340 could be attached to the subject holder, one advantage of having them portable and separate from the subject holder 24 is that they may be located at more remote distances which permit smoother light distribution over the surface of the subject holder. The individual lamps are also swivelly mounted on pedestals 340 for convenience in directing the light rays onto the copy work C.

It is a further feature of the invention that the copy material C on the subject holder may be also back-lighted to improve the contrast of the lines thereof. Referring therefore to FIGS. 4 and 5 with FIGS. 1 and 2, it will be seen that rear illumination of the translucent surface 48 of the subject holder 24 may be obtained from fluorescent bulbs 320 mounted in a panlike frame or board 322 suspended from the rear end of the rail supporting structure 76. The position of said board 320 may be stabilized parallel to the subject holder by the pins 324 shown in FIG. 5.

Desirably also, the controls for operating the movement of the optical head relative to the subject holder and focusing of the objective lenses thereon for the different spatial settings of the optical head relative to the subject holder are centrally localized in panel 400 (FIGS. 1 and 20).

Referring therefore now to FIGS. 1 and 20, the utility of the apparatus will be briefly described. To start operation, master switch 402 is turned to its on position as is also button 403 which energizes the vacuum pump controlling the air evacuation of the channels in the film holder 30. Button 404 is also turned to its on position to energize the turbine which evacuates air from under the transparent roller 54 of the subject holder surface 48. Button 427 is connected into the circuit of motor 114 so as to energize motor 114 which moves optical head 20 along rails 22. Then by depressing button 406, the motor can be rotated in a direction which moves the optical head toward the subject holder. Button 408 when depressed causes the motor 114 to rotate in the opposite direction and so moves the optical head away from the subject holder. Thus, if the optical head is too close to the subject holder 24. The operator may wish to depress button 408 in order to move the optical head far enough away from the subject holder for his convenience in working on the subject holder. At 410 in FIG. 1 is a dual foot switch control connected by a long line 412 into the main line of the apparatus leading to the motor 68 which may be operated to raise and lower the cover sheet 54 on the subject holder. When one side of the switch is depressed the motor is operated in a direction to raise the cover sheet 54 and when the other side is depressed the motor rotates in the opposite direction to lower the cover sheet. By rolling the cover sheet 54 to its high position the operator may center or otherwise locate the sheet material C to be copied on the surface 48 and then by depressing the appropriate side of the dual switch 410 lower the cover sheet 54 downwardly across the copy in order to evacuate air from therebetween and so tightly hold the copy against the surface 48 of the subject holder. The operator may then press button 406, for example, to bring the optical head to a position spaced from the subject holder 24 indicated by meter 128 as providing the desired image reduction. Thereafter switch 426 may be actuated to energize motor 220. Then by depressing either button 414 or 416 he may adjust the spacing of the objective from the film holder 30 until the reading of the meter 230 corresponds to that which he understands provides the best focus for the magnification indicated by reading meter 128. Ordinarily the spatial settings of the objective and optical head as read off meters 128 and 230 for a particular focus and magnification factor will be made a part of the record of each photograph taken and thus available for "reshooting" or printing copies of the film.

In FIG. 20 dial switch 422 represents a timer settable for even seconds from 1 through 10 and dial switch 424 represents a timer settable for from 0.2 of a second through 0.8 of a second, or 10 seconds through 50 seconds in multiples of 10, so that any desired timing from 0.2 of a second through 60 seconds may be achieved. Dial switches 422 and 424 control the duration of time which shutter 32 is opened by depressing exposure trigger 423. It will be understood that in the normal operation of the apparatus vacuum is continuously applied to the channel 50 about the subject holder surface 48 and channel 252 about the surface 246 of the film holder platen 240. Alternatively, however, means could be provided whereby the film would be drawn to the film holder surface only upon operation of the trigger button 423 and immediately ahead of the employment of the shutter using a time-delay element to insure that the film is vacuumized flat before the shutter opens. Switch 425 should be set to place the shutter on "automatic" (actuatable for duration determined by switches 422 and 424 when trigger 423 is depressed).

The copy is now properly located on the subject holder, the necessary focus settings have been attended to. The procedure up to this point has been done in white room light for convenience sake. The white room light is now turned off and the safelights are turned on. The operator then removes a cut sheet of film from its box or from the light-tight cabinet, punches holes in one of its edges for exact placement on the registration of pins 262 gaining access thereto through door 272. When the film is located on the register pins the operator may find it advantageous to flatten the film by wiping his hand across the film. The film compartment access door is then closed. Because the optical head 20 is being operated as a camera, button 420, which operates the projection source light is not energized. Exposure time control knobs 422 and 424 are set for the length os exposure desired. Front light controlling switch 418 and the back light controlling switch 417 also may be actuated as requirements suggest. The film is then exposed by depressing trigger 423. When trigger 423 is tripped the interlocking vacuum line 290 connects via solenoid valve 294 to the vacuum shutter 32 and the shutter opens. When the exposure interval is completed the shutter automatically closes. After the operator manually turns off the subject holder lighting which leaves the room in safelight only, the film can be removed for developing. The cover sheet 54 and the subject holder can then be raised and the copy removed. The apparatus is now ready for the next "shot" of another original, or it may be employed as a projector. This procedure will now be described.

When the film has been developed and the operator is ready to make copies thereof, he positions the developed film on registration pins 262 so that it is in the same centered and angular disposition to axis OA as it was when originally exposed. The film compartment door 272 is thereafter closed. The operator will raise cover sheet 54 on the subject holder, and with the room in a darkened and safe-lighted condition locate sensitive medium of the surface 48 of the subject holder and then again lower the cover sheet 54 thereover so as to tightly hold the sensitive paper against the surface 48 of the subject holder.

Assuming the film has been placed in the film holder and both the objective and the optical head moved to their appropriate positions corresponding to that at which the film image was originally produced utilizing the previously recorded readings of meters 128 and 230 respectively, the apparatus is ready for photoprinting a copy of the developed film. This time the projector button 420 is actuated to its on position to prepare the light source for energizing. The operator will also locate either the point source of light 176 or the flood lamp light 178 behind opening 160 and on optical axis OA according to his particular printing requirements, utilizing either handle 184 or button 401 to energize motor 198 as the case may be. For line film the point source light would be used. For continuous tone the flood or opal bulb would produce the best results. The operator may also wish to adjust the intensity of the projector light by setting rheostat control knob 182. Timer control knobs 422 and 424 are also set for the required duration of shutter opening and when everything is ready for printing, trigger 423 is tripped to effect the printing. If the operator wishes to use the apparatus solely as a projector he can do so by setting switch 425 to its "shutter open" position.

If the operator wishes to selectively improve areas of the original, he can make several negatives of one drawing with different exposures, even developing the films differently, then selectively printing each type of area with one registered exposure on top of another, adjusting the duration of exposure to get the best possible line delineation for each section. From these several exposures he can then produce a composite image of such quality as would be impossible to produce from a film having a compromise exposure. The thus briefly described optical disection of the original and selectively printing each category or section is made practical in the described apparatus by reason that the surface of both the film and the copy on the respective holders can be maintained in exact parallel relation to each other and in exact registration with relation to the optical axis of the apparatus. Furthermore, the focus is not adulterated nor is the image distorted as by placing the film between glass or in a position other than the exact position in which the image was originally conceived.

A drawing to be copied may have areas of different quality and clarity. With the described apparatus it is possible to take a number of exposures of the single drawing, each under conditions of lighting controlled to justify one of said areas. Each of said films may be then developed to its best advantage. Unwanted areas of each negative may be then masked and the unmasked area of each film printed. During the printing of each film it is also possible to again adjust the exposure to give the best possible line delineation. In this manner, an operator is able to produce a composite with considerable improvement in clarity and line delineation over the original. Such an optical disection of the original to produce a composite copy is practical in the described apparatus by reason that the surfaces of both the film and the copy on the respective holders can be maintained in exact parallel relation to each other and each of the developed negatives can be exactly registered and in the same relation to the optical axis of the apparatus and the photo printed images thereof which produce the composite. It will be understood, of course, that once a composite has been printed a new negative may then be taken of the composite and utilized to print as many copies as are required.

In addition, it will be understood that the apparatus is also useful as where it is desired to combine or superpose copies of two originals in a single print. For example, if three different drawings containing different information are to be superposed, each original may be exposed under different conditions and after the negatives have been developed one may be photoprinted over the other. Because of the described registration and alignment of the film platen and subject holder surfaces relative to each other and to the optical axis, the superposed prints can be exactly registered and in accordance with the conditions under which the negatives are produced all of the information of the several originals will appear in the one copy.

From the aforesaid description of one embodiment of the invention and a demonstration of its utility, it will be apparent that all of the recited objects and features, as well as advantages of the invention have been indicated as obtainable in a highly practical manner. Furthermore, it will be understood therefrom that many changes and/or variations in the illustrated structure may be obtained within the spirit of the invention as the same is more particularly defined by the claims.

Thus having described my invention, I claim:

1. Photographic apparatus for reproducing copy including, in combination, a frame comprising overhead-supported horizontal guide means, a subject holder having an upright surface disposed below and adjacent one end of said guide means, the guide means being supported at said one end by the subject holder and a rigid columnar supporting structure supporting the opposite end of the guide means, said rigid columnar structure and subject holder supporting the guide means in a horizontal fixed overhead normal relation to the upright surface of the subject holder, a trolley supported by said guide means for movement longitudinally thereof toward and away from the subject holder, a film holder fixedly suspended to said trolley to move therewith beneath the guide means toward and away from said upright surface of the subject holder, and an objective carried by said trolley to move therewith and the film holder, said objective being supported between the film holder and subject holder in coaxial alignment with said film holder and axially movable toward and away from the film holder, wherein the subject holder comprises a translucent member and a light member is suspended to the frame comprising the guide means in spaced relation behind the subject holder.

2. Photographic apparatus for reproducing copy comprising, in combination, overhead-supported horizontal guide means, a subject holder having an upright surface disposed below and adjacent one end of said guide means, a trolley supported by said guide means for movement longitudinally thereof toward and away from the subject holder, a film holder fixedly suspended to said trolley to move therewith beneath the guide means toward and away from said upright surface of the subject holder, and an objective carried by said trolley to move therewith and the film holder, said objective being supported between the film holder and subject holder in coaxial alignment with said film holder and axially movable toward and away from the film holder, wherein the film holder and objective are enclosed within a common support suspended fro the trolley, said common support further including illuminating means coaxially aligned with the film holder on the side thereof away from the subject holder, and said common support having means for simultaneously changing the axial spacing of the illuminating means from the film holder as the objective is axially moved toward and away from the film holder.

3. Photographic apparatus as claimed in claim 2 wherein the guide means comprise a pair of parallel spaced guide rails and the apparatus includes means supporting said rails in fixed parallel spaced horizontal overhead normal disposition to the upright surface of the subject holder.

4. Photographic apparatus as claimed in claim 2 further including means for lighting the upright surface of the subject holder.

5. Photographic apparatus as claimed in claim 2 wherein the illuminating means comprises a point source of illumination and flood light illuminating means, said flood light and point source of light being mounted for movement in a direction transversely of the film holder and subject holder so as to be selectively alignable coaxially with the film holder and objective.

6. Photographic apparatus for reproducing copy comprising, in combination, overhead-supported horizontal guide means, a subject holder having an upright surface disposed below and adjacent one end of said guide means, the guide means being supported at one end by the subject holder and a rigid columnar supporting structure supporting the opposite end of the guide means, said rigid columnar structure and subject holder supporting the guide means in a horizontal fixed overhead normal relation to the upright surface of the subject holder, a trolley supported by said guide means for movement longitudinally thereof toward and away from the subject holder, a film holder fixedly suspended to said trolley to move therewith beneath the guide means toward and away from said upright surface of the subject holder, and an objective carried by said trolley to move therewith and the film holder, said objective being supported between the film holder and subject holder in coaxial alignment with said film holder and axially movable toward and away from the film holder, wherein the columnar supporting means and upright subject holder are provided with pneumatic leveling means which are selectively adjustable to retain the guide means in a horizontal plane and to resist transmission of vibrations between the apparatus and the floor on which the apparatus is mounted.

7. Photographic apparatus for reproducing copy comprising, in combination, an upright subject holder, an overhead supported frame, a pair of guide rails fixed to said frame and supported thereby in spaced parallel horizontal relation, a trolley mounted on said guide rails for longitudinal movement of the frame toward and away from subject holder, an optical head suspended from said trolley to move therewith beneath said overhead-supported frame, means including a reversible electric motor mounted on said trolley operable to propel said trolley toward and away from the subject holder, pulley means rotatably mounted on said frame, and flexible electric conduit means wound on said pulley for connecting said trolley drive motor to an electrical power source, said pulley means being simultaneously rotated with energizing of the trolley drive motor to wind and unwind said conduit means thereon as the trolley moves the optical head toward and away from subject holder.

8. Photographic apparatus as claimed in claim 7 wherein the optical head also includes an electrically energized light source connected to said flexible electrical conduit means as through the trolley.

9. Photographic apparatus as claimed in claim 7 wherein the optical head includes vacuum operated film holder and shutter means and the overhead supported frame supports a second rotatable pulley means, and flexible vacuum conduit means for connecting said film holder and shutter means to air evacuating means wound on the other of said pulley means, both said pulley means being simultaneously rotated with energizing of the trolley drive motor in order to wind and unwind said conduit means thereon as the trolley moves the optical head toward and away from subject holder.

10. Photographic apparatus comprising overhead-supported horizontal guide means, an upright subject holder beneath and adjacent one end of said guide means, an optical head suspended beneath said guide means and movable therealong toward and away from the subject holder, said optical head including a film holder, a pair of horizontal parallel spaced guide rods disposed normal to and above said film holder, an objective holder slidably supported on said guide rods between the film holder and the subject holder, a light source holder slidably supported on said guide rods to the other side of said film holder, and drive means operably connected to said objective holder and light source holder for simultaneous adjusting the spacing of the light source holder from the film holder as the objective holder is moved toward and away from the film holder to adjust the focus thereof, wherein the optical head includes a motor-rotated drive shaft rotatably supported in spaced parallel relation to said guide rods, said drive shaft having threaded first and second portions, and the objective holder and light source holder each having a portion threadedly connected to a respective one of said first and second threaded portions of the drive shaft such that the light source holder moves with respect to the film holder as the objective holder is moved.

11. Photographic apparatus as claimed in claim 10 having meter means operatively associated with the said drive shaft to indicate the spacing of the objective holder from the film holder.

12. Photographic apparatus as claimed in claim 10 wherein the two threaded portions of the drive shaft are disconnectable from each other, and means securing said two threaded portions for conjoint rotation.

13. Photographic apparatus comprising overhead supported horizontal guide means, an upright subject holder beneath and adjacent one end of said guide means, an optical head suspended beneath said guide means and movable therealong toward and away from the subject holder, said optical head including a film holder, a pair of horizontal parallel spaced guide rods disposed normal to and above said film holder, an objective holder slidably supported on said guide rods between the film holder and the subject holder, a light source holder slidably supported on said guide rods to the other side of said film holder, and drive means operably connected to said objective holder and light source holder for simultaneous adjusting the spacing of the light source holder from the film holder as the objective holder is moved toward and away from the film holder to adjust the focus thereof, wherein the film holder and objective holder having interfitting rigid enclosures, one telescoping with the other with movement of the objective holder, the enclosure of the film holder having an entrance providing access for inserting and removing film from the film holder.

14. Photographic apparatus as claimed in claim 13 wherein at least one of said interfitting enclosures includes a gasket in continuous engagement with the adjacent surface of the other enclosure maintaining a light seal between the interfitting enclosures as one enclosure telescopes with respect to the other with movement of the objective holder.

15. Photographic apparatus as claimed in claim 14 wherein each of said enclosures includes a resilient gasket in continuous engagement with the adjacent surface of the enclosure telescoped therewith.

16. Photographic apparatus as claimed in claim 10 wherein a pair of lamps, one comprising a point source, are mounted on the light source holder for transverse movement so as to be selectively alignable with the film holder.

17. Photographic apparatus as claimed in claim 16 wherein the other lamp comprises a flood lamp.

18. Photographic apparatus as claimed in claim 16 wherein the lamps are mounted on a slide which is movable transversely of the film holder.

19. Photographic apparatus as claimed in claim 18 wherein the light source holder includes switch means operatable by movement of said slide so as to selectively energize the lamp which aligns with the film holder.

20. Photographic apparatus as claimed in claim 19 wherein adjustable limit means are provided such that the slide is movable between two extreme positions in each of which a respective one of the two lamps aligns with the film holder.

21. In photographic apparatus employing a subject holder, a transparent film holder, condenser lens means behind the film holder and an objective in front of the film holder therebetween and the subject holder, said condenser lens means, film holder and objective being in coaxial aligned relation, a projector light source behind the condenser lens means including a motor driven supporting member movable transversely of the axis with which said condenser lens means, film holder and objective are aligned, a pair of spaced illuminatable lamps on said member, means for guiding said member between a pair of positions, in one of which positions one of said lamps aligns with said axis and in the other of which positions the other lamp aligns with said axis, and means operable to illuminate only the lamp aligned on said axis.

22. In photographic apparatus employing a subject holder, a transparent film holder, condenser lens means behind the film holder and an objective in front of the film holder therebetween and the subject holder, said condenser lens means, film holder and objective being in coaxial aligned relation, a projector light source behind the condenser lens means including a supporting member movable transversely of the axis with which said condenser lens means, film holder and objective are aligned, a pair of spaced illuminatable lamps on said member, means for guiding said member between a pair of positions, in one of which positions one of said lamps aligns with said axis and in the other of which positions the other lamp aligns with said axis, and means operable to illuminate only the lamp aligned on said axis, wherein switch means are provided which are operated by the movement of the member into one of said two positions to automatically condition the lamp aligned on said axis for energizing.

23. In photographic apparatus employing a subject holder, a transparent film holder, condenser lens means behind the film holder and an objective in front of the film holder therebetween and the subject holder, said condenser lens means, film holder and objective being in coaxial aligned relation, a projector light source behind the condenser lens means including a supporting member movable transversely of the axis with which said condenser lens means, film holder and objective are aligned, a pair of spaced illuminatable lamps on said member, one of said lamps being a point source light, means for guiding said member between a pair of positions, in one of which positions one of said lamps aligns with said axis and in the other of which positions the other lamp aligns with said axis, and means operable to illuminate only the lamp aligned on said axis.

24. A projector light source as claimed in claim 23 wherein the other of said lamps is a flood lamp.

25. In a camera-projector useful to photograph an image of a subject on film and then to projection-print the film image on sensitive material, the combination of a vertically fixed subject holder and a vertically fixed film holder each comprising transparent members having their facing surfaces in parallel spaced relation, a channel about the surface of each said holders connected to air evacuating means and at least the subject holder having a roll of flexible transparent material which may be rolled over its said surface and surrounding channel to hold sheet material positioned thereon flat therebetween against its surface and parallel to the facing surface of the other holder. At least the film holder having spaced registration means along one edge by which film having complementing portions may be repetitively located on the film holder surface in precisely the same position and angular disposition relative to the subject holder surface, a light source behind the film holder and an objective in front of said film holder therebetween and the subject holder, the film holder, light source and objective being coaxially aligned and movable as a unit along a common axis toward and away from the subject holder in a direction normal to the subject holder surface, the objective being movable in a direction parallel to said axis and independently of said movement of the unit, the light source being operatively connected to the objective to move axially therewith, and means whereby said axial adjustments of the objective and film holder are obtainable while retaining the film holder, subject holder, objective and light source in precise alignment and angular disposition to said axis.

* * * * *

UNITED STATES PATENT OFFICE

CERTIFICATE OF CORRECTION

Patent No. 3,639,054      Dated February 1, 1972

Inventor(s) Joseph H. Wally, Jr.

It is certified that error appears in the above-identified patent and that said Letters Patent are hereby corrected as shown below:

Column 14, line 43 (Claim 2, line 15)
        Change "fro" to --from--.

Column 16, line 20 (Claim 13, line 16)
        Change "having" to --have--.

Column 18, line 9 (Claim 25, line 11)
        Change "therebetween" to --therebeneath--.

Column 18, line 10 (Claim 25, line 12)
        Change the _period_ (.) to a _comma_ (,)

Signed and sealed this 4th day of July 1972.

(SEAL)
Attest:

EDWARD M.FLETCHER,JR.          ROBERT GOTTSCHALK
Attesting Officer                   Commissioner of Patents